United States Patent
McDonald et al.

(10) Patent No.: US 9,654,643 B2
(45) Date of Patent: *May 16, 2017

(54) METHOD AND APPARATUS FOR UNIDIRECTIONAL SUMMING OF GROUP AUDITORY DATA

(71) Applicant: MOTOROLA SOLUTIONS, INC, Schaumburg, IL (US)

(72) Inventors: Daniel J McDonald, Cary, IL (US); Arthur L Fumarolo, Schaumburg, IL (US); Mark Shahaf, Vernon Hills, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 486 days.

This patent is subject to a terminal disclaimer.

(21) Appl. No.: 14/025,998

(22) Filed: Sep. 13, 2013

(65) Prior Publication Data
US 2015/0079920 A1   Mar. 19, 2015

(51) Int. Cl.
*H04M 3/56* (2006.01)
*H04W 4/10* (2009.01)
*H04L 29/06* (2006.01)

(52) U.S. Cl.
CPC ........ *H04M 3/568* (2013.01); *H04L 65/4038* (2013.01); *H04L 65/80* (2013.01); *H04W 4/10* (2013.01)

(58) Field of Classification Search
CPC ......... H04M 3/568; H04W 4/08; H04W 4/22; H04W 4/10; H04L 65/4038; H04L 65/80
(Continued)

(56) References Cited

U.S. PATENT DOCUMENTS 5,423,061 A * 6/1995 Fumarolo ............. H04W 84/08
455/512
6,005,848 A 12/1999 Grube et al.
(Continued)

FOREIGN PATENT DOCUMENTS

| WO | 9610869 A1 | 4/1996 |
| WO | 2002089501 A1 | 11/2002 |
| WO | 2011008789 A1 | 1/2011 |

OTHER PUBLICATIONS

USA Office Action Dated Jul. 16, 2015 for Related U.S. Appl. No. 14/025,955.

*Primary Examiner* — Lester Kincaid
*Assistant Examiner* — William Wang
(74) *Attorney, Agent, or Firm* — Daniel R. Bestor

(57) ABSTRACT

A first group auditory data stream, from a transmitting subscriber device of a first group of subscriber devices or from a dispatch console and intended for the first group of subscriber devices, is received at a conference server. The conference server determines whether the first group auditory data stream generated for the first group of subscriber devices is of interest to a second group of subscriber devices, and if so, sums the first group auditory data stream with a second group auditory data stream intended for the second group of subscriber devices to form a summed group auditory data stream. The conference server then forwards the summed group auditory data stream towards the second group of subscriber devices and forwards the first group auditory data stream towards the first group of subscriber devices.

20 Claims, 3 Drawing Sheets

(58) Field of Classification Search
USPC .......................................................... 455/416
See application file for complete search history.

(56) References Cited

U.S. PATENT DOCUMENTS

| | | | |
|---|---|---|---|
| 6,011,851 A | 1/2000 | Conno et al. | |
| 6,308,079 B1 | 10/2001 | Pan et al. | |
| 6,584,324 B1 | 6/2003 | Vivekanandan | |
| 6,792,281 B2 | 9/2004 | Upp et al. | |
| 6,895,254 B2 | 5/2005 | Dorenbosch | |
| 6,928,063 B2 | 8/2005 | Pancha et al. | |
| 6,944,137 B1 | 9/2005 | Pan et al. | |
| 7,209,763 B2 | 4/2007 | Martin et al. | |
| 7,684,816 B2 | 3/2010 | Furrer et al. | |
| 7,860,070 B2 | 12/2010 | Shaffer et al. | |
| 7,925,246 B2 | 4/2011 | McKibben et al. | |
| 7,945,624 B2 | 5/2011 | Guccione | |
| 8,041,057 B2 | 10/2011 | Xiang et al. | |
| 8,078,188 B2 | 12/2011 | Zivney | |
| 8,126,494 B2 | 2/2012 | Shaffer et al. | |
| 8,145,249 B2 | 3/2012 | Shaffer et al. | |
| 8,150,450 B1 | 4/2012 | Wengrovitz | |
| 8,355,691 B2 | 1/2013 | Roy et al. | |
| 2004/0052218 A1 | 3/2004 | Knappe | |
| 2005/0239486 A1 | 10/2005 | D'Avello et al. | |
| 2006/0063551 A1* | 3/2006 | Martin | H04M 3/56 455/519 |
| 2006/0079262 A1 | 4/2006 | Harris et al. | |
| 2007/0104121 A1* | 5/2007 | Shaffer | H04L 65/4061 370/276 |
| 2007/0299661 A1* | 12/2007 | Raad | H04M 3/568 704/221 |
| 2008/0102869 A1* | 5/2008 | Shaffer | H04W 4/10 455/518 |
| 2008/0159128 A1 | 7/2008 | Shaffer et al. | |
| 2009/0143007 A1 | 6/2009 | Terlizzi | |
| 2009/0312045 A1* | 12/2009 | Miller | H04W 4/08 455/519 |
| 2010/0159975 A1* | 6/2010 | Shaffer | H04W 76/062 455/516 |
| 2010/0165889 A1* | 7/2010 | Madabhushi | H04M 3/2227 370/261 |
| 2010/0197333 A1* | 8/2010 | Shaffer | H04W 4/021 455/515 |

\* cited by examiner

METHOD AND APPARATUS FOR UNIDIRECTIONAL SUMMING OF GROUP AUDITORY DATA

BACKGROUND OF THE INVENTION

Radio access networks (RANs) provide for radio communication links to be arranged within the network between a plurality of user terminals. Such user terminals may be mobile and may be known as 'mobile stations' or 'subscriber devices.' At least one other terminal, e.g. used in conjunction with subscriber devices, may be a fixed terminal, e.g. a base station, eNodeB, repeater, and/or access point. Such a RAN typically includes a system infrastructure which generally includes a network of various fixed terminals, which are in direct radio communication with the subscriber devices. Each of the fixed terminals operating in the RAN may have one or more transceivers which may, for example, serve subscriber devices in a given region or area, known as a 'cell' or 'site', by radio frequency (RF) communication. The subscriber devices that are in direct communication with a particular fixed terminal are said to be served by the fixed terminal. In one example, all radio communications to and from each subscriber device within the RAN are made via respective serving fixed terminals. Sites of neighboring fixed terminals may be offset from one another and may be non-overlapping or partially or fully overlapping with one another.

RANs may operate according to an industry standard protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Because these generally systems provide lower throughput than the 3 GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Subscriber devices in RANs such as those set forth above send and receive auditory data (encoded voice, audio, or audio portions of an audio/video stream) in accordance with the designated protocol.

OMA-PoC, in particular, enables familiar PTT and "instant on" features of traditional half duplex subscriber devices, but uses mobile subscriber devices operating over modern cellular telecommunications networks. Using PoC, wireless subscriber devices such as mobile telephones and notebook computers can function as PTT half-duplex subscriber devices for transmitting and receiving auditory data. Other types of PTT models and multimedia call models (MMCMs) are also available.

Floor control in an OMA-PoC session is generally maintained by a PTT server that controls communications between two or more wireless subscriber devices. When a user of one of the subscriber devices keys a PTT button, a request for permission to speak in the OMA-PoC session is transmitted from the user's subscriber device to the PTT server using, for example, a real-time transport protocol (RTP) message. If no other users are currently speaking in the PoC session, an acceptance message is transmitted back to the user's subscriber device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other subscriber devices in the group of subscriber devices or talkgroup to which the user is subscribed), using for example a unicast, point to multipoint, or broadcast communication technique.

Narrowband LMR systems, on the other hand, operate in either a conventional or trunked configuration. In either configuration, a plurality of subscriber devices are partitioned into separate groups of subscriber devices. In a conventional system, each subscriber device in a group is selected to a particular frequency for communications associated with that subscriber device's group. Thus, each group is served by one channel, and multiple groups may share the same single frequency (in which case, in some embodiments, group IDs may be present in the group data to distinguish between groups using the same shared frequency).

In contrast, a trunked radio system and its subscriber devices use a pool of traffic channels for virtually an unlimited number of groups of subscriber devices (e.g., talkgroups). Thus, all groups are served by all channels. The trunked radio system works to take advantage of the probability that not all groups need a traffic channel for communication at the same time. When a member of a group requests a call on a control or rest channel on which all of the subscriber devices in the system idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the subscriber devices were idling to a traffic channel for the call, and instruct all subscriber devices that are not participating in the new call to move to a newly assigned control or rest channel selected from the pool of available channels. With a given number of channels, a much greater number of groups can be accommodated in a trunked system as compared with conventional radio systems.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., subscriber devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, subscriber devices may dynamically affiliate with a group (and also disassociate with the group) perhaps based on user input, and the switching and/or radio network may track group membership and route new group calls according to the current group membership.

One problem that has arisen with the use of groups to distribute auditory data to subscriber devices is that a situation may arise where a particularly important message or communication needs to be distributed across multiple groups or across all groups in a radio communication system. Various attempts at addressing this problem have been proposed and/or implemented in the past, including, for example, implementation of an "all-call" feature in which a particular subscriber device (perhaps having appropriate permissions) can transmit a message to all subscriber devices in the radio communication system. However, the all-call feature does not provide any granularity regarding which groups to transmit the message to (or which not to), and it also causes all other group calls occurring at the time to be terminated in favor of the all-call. Another proposed solution, called a dynamic regroup or group regroup, is able to form a new group containing all subscriber device members of prior designated groups. This feature, however, similarly loses the granularity of having the separate groups that existed prior to the regroup, and may also require the termination of one or all ongoing calls existing in the groups prior to the regroup. Still one other proposed solution involves using conference bridging to bridge groups together. However, in this situation, all auditory data from each active group travels to every other group in the bridge (e.g., all groups in the bridge are mixed together), which may cause increased confusion and again eliminates the granularity provided by the prior separation of subscriber devices into groups.

Accordingly, what is needed is an improved method and apparatus for selectively allowing auditory data transmitted for one group of subscriber devices to be received and heard in one or more other groups, without requiring any ongoing calls in the other groups to be terminated, and without requiring all auditory data communications to be shared amongst all groups.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
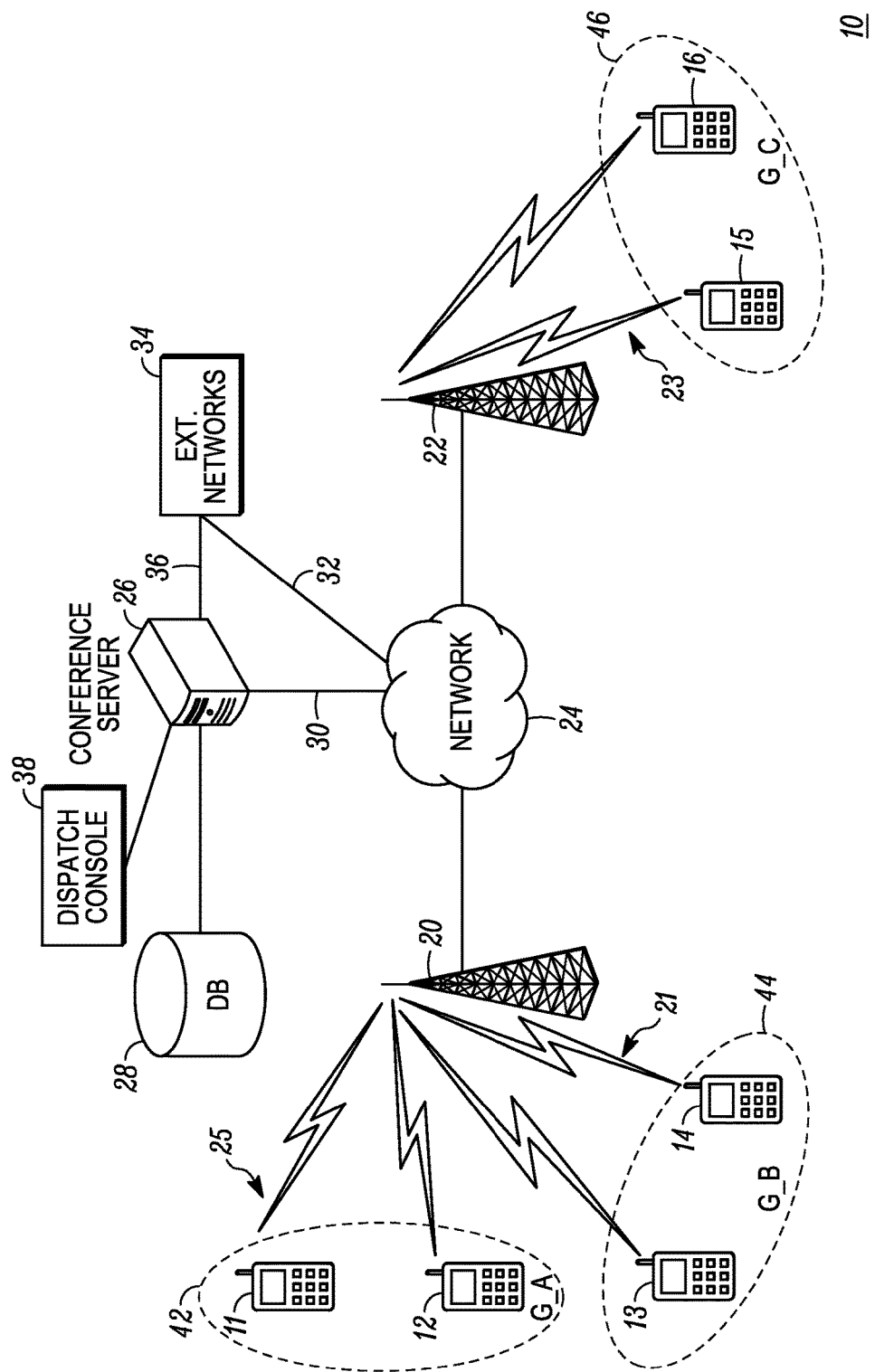
FIG. 1 is a block diagram of a communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for selectively allowing auditory data communications in one group to be received and heard in one or more other groups, without requiring any ongoing calls in the other groups to be terminated, and without requiring all auditory data communications to be shared amongst all groups.

In one embodiment, a first group auditory data stream, from a transmitting subscriber device of a first group of subscriber devices or from a dispatch console and intended for the first group of subscriber devices, is received at a conference server. The conference server determines whether the first group auditory data stream generated for the first group of subscriber devices is of interest to a second group of subscriber devices, and if so, sums the first group auditory data stream with a second group auditory data stream intended for the second group of subscriber devices to form a summed group auditory data stream. The conference server then forwards the summed group auditory data stream towards the second group of subscriber devices and forwards the first group auditory data stream towards the first group of subscriber devices.

In another embodiment, a conference server for unidirectional summing of group auditory data comprises a transceiver, a data store, and one or more processors configured to: receive, via the transceiver, a first group auditory data stream from a transmitting subscriber device of a first group of subscriber devices or from a dispatch console and intended for the first group of subscriber devices, determine, via the data store, whether the first group auditory data stream generated for the first group of subscriber devices is of interest to a second group of subscriber devices, and if so, sum the first group auditory data stream with a second group auditory data stream intended for the second group of subscriber devices to form a summed group auditory data stream, then forward, via the transceiver, the summed group auditory data stream towards the second group of subscriber devices and forward, via the transceiver, the first group auditory data stream towards the first group of subscriber devices.

Each of the above-mentioned embodiments will be discussed in more detail below, starting with example network and device architectures of the system in which the embodiments may be practiced, followed by an illustration of processing steps and message transmissions for supporting unidirectional summing of group auditory data from a system perspective. Further advantages and features consistent with this disclosure will be set forth in the following detailed description, with reference to the figures.

1. NETWORK ARCHITECTURE AND DEVICE STRUCTURE

FIG. 1 illustrates a communications network 10 including client subscriber devices (e.g., SDs) 11-16, fixed terminals 20, 22 (e.g. base stations (BSs)), wireless links 21, 23, 25, backhaul network 24, conference server 26, database 28, communications connections 30, 32, 36, dispatch console 38, and external networks 34. Each BS 20, 22 has at least one radio transmitter covering a radio coverage cell (not shown). One or several SDs 11-16 within radio coverage of the BSs may connect to the BSs using a wireless communication protocol via wireless links 21, 23, 25. The SDs 11-16 may communicate with each other, and perhaps other devices accessible via other network links, using a group communications protocol over wireless links 20, 22. Wireless links 21, 23 may be, for example, a wireless link supporting a standard or protocol such as GPRS or UMTS, 2G (e.g. GSM), 3G (e.g. WCDMA or LTE), 4G (WiMAX or LTE), iDEN, wireless LAN (WLAN), ETSI Digital Mobile Radio (DMR), Project 25 (P25) standard defined by the Association of Public Safety Communications Officials International (APCO), or other radio protocols or standards. The SDs 11-16 may be configured with an identification reference (such as an International Mobile Subscriber Identity (IMSI)) which may be connected to a physical media (such as a Subscriber Identity Module (SIM) card).

Each SD 11-16 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in communications network 10 allows a single SD, such as SD 11, to communicate with one or more members (such as SD 12) associated with a particular group of SDs at the same time. In the example set forth in FIG. 1, SDs 11 and 12 are members of a first group G_A 42, SDs 13 and 14 are members of a second group G_B 44, and SDs 15 and 16 are members of a third group G_C 46.

Although only six SDs and two BSs are illustrated in FIG. 1, the present disclosure is not limited as such, and more or fewer SDs and more or fewer BSs could be used in any particular implementation. Furthermore, while a single conference server 26 is illustrated in FIG. 1, more than one conference server 26 may be used and/or a distributed conference server 26 may be used that divides functions across multiple devices, perhaps for load balancing reasons. Finally, while database 28 is illustrated as directly coupled to conference server 26, database 28 may also be remote from conference server 26 and accessible to conference server 26 via one or more of network 24 and/or external networks 34.

The BSs 20, 22 may be linked to the conference server 26 via network 24 and communications connection 30. Network 24 may comprise one or more BSs, routers, switches, LANs, WLANs, WANs, access points, or other network infrastructure. For example, conference server 26 may be accessible to BSs 20, 22 via a dedicated wireline or via the Internet. In one example, BSs 20, 22 may be directly coupled to conference server 26 via one or more internal links under control of a single communications network provider. Network 24 may further include a call controller, PTT server, zone controller, mobile management entity (MME), base station controller (BSC), mobile switching center (MSC), site controller, Push-to-Talk controller, or other network device for controlling and distributing group auditory data amongst SDs via respective BSs.

Conference server 26 may be a separate device configured to determine which group auditory data should be shared with which other groups (e.g., which of the other groups are 'interested in' or subscribed for receiving auditory data from one or more active group(s)), and to responsively unidirectionally sum the auditory data from the active group(s) with existing auditory data in each interested group (if any), before forwarding the summed auditory data out to the SDs in the interested groups. Auditory data may be provided to the conference server 26 for summing via communications connection 30. In other embodiments, conference server 26 may be embodied within or coupled to another network device, such as a call controller, PTT server, zone controller, MME, BSC, MSC, site controller, Push-to-Talk controller, or other network device, existing in network 24 or elsewhere, in which case auditory data could be provided to the conference server 26 via the another network device for summing. Importantly, the term "auditory data" is not intended to be limited to voice communications, but rather, to embody all possible digitized auditory payloads, including but not limited to, voice, audio, and/or audio portions of a combined audio/video stream.

Database 28 may function to store various mappings, such as an inter-group priority mapping or an inter-group subscription mapping for use in determining which of the other groups are interested in or subscribed for receiving auditory data from an active group. The stored mapping(s) can be used by the conference server 26 to determine whether a particular active group's auditory data should be summed with current auditory data of interested group(s), or simply sent to (if there is no ongoing call in the interested group(s)) the interested group(s) in a new conference server initiated call, as a function of the mapping(s).

The one-to-many group communication structure may be implemented in communications network 10 in a number of ways and using any one or more messaging protocols, including multiple unicast transmissions (each addressed to a single group member SD), single multicast transmissions (addressed to a single group or multiple groups), single broadcast transmissions (the broadcast transmission perhaps including one or more group identifiers that can be decoded and matched by the receiving SDs), or any combination thereof.

External networks 34 may also be accessible to BSs 20, 22 (and thus SDs 11-16) via network 24 and communications connection 32 and/or conference server 26 and communications connections 30, 36. External networks 34 may include, for example, a public switched telephone network (PSTN), the Internet, or another wireless service provider's network, among other possibilities.

Communications system 10 may implement, in one embodiment, a narrow-band trunked radio communication system in which SDs 11-16 transmit control and data messages in accordance with an air interface protocol such as that defined by the DMR or APCO P25 standards. In this embodiment, wireless links 21, 23, 25 may be shared channels based on group. For example, group G_A 42 SDs 11 and 12 may share a same conventional (statically assigned frequency) or trunked (dynamically assigned frequency and/or timeslot) channel over narrowband wireless link 25, group G_B 44 SDs 13 and 14 may share a same conventional or trunked channel over narrowband wireless link 21, and group G_C SDs 15 and 16 may share a same conventional or trunked channel over narrowband wireless link 23. Other types of conventional or trunked protocols could be implemented as well.

In another embodiment, communications system 10 may implement an OMA-PoC or PoIP broadband architecture in which SDs 11-16 transmit control and data messages in accordance with a protocol such as RTP and/or SIP. In this embodiment, wireless links 21, 23, 25 may carry individual broadband IP links over which group traffic is unicast, multicast, or broadcast. For example, group G_A 42 SDs 11 and 12 may establish unicast, multicast, and/or broadcast IP links over broadband wireless link 25, group G_B 44 SDs 13 and 14 may establish unicast, multicast, and/or broadcast IP links over broadband wireless link 21, and group G_C SDs 15 and 16 may establish unicast, multicast, and/or broadcast IP links over broadband wireless link 23. Other types of broadband protocols could be implemented as well.

Dispatch console 38 may be directly coupled to conference server 26 as shown, or may be indirectly coupled to conference server 26 via one or more of network 24 and external networks 34, or some other network device such as a radio controller in network 24. The dispatch console 38 may provide an administrative or dispatch access to SDs 11-16 and conference server 26, and allow an administrator or dispatcher to initiate infrastructure-sourced group communications to groups of SDs 11-16, including the summing function provided by conference server 26, among other features and functions.

Figure 2:
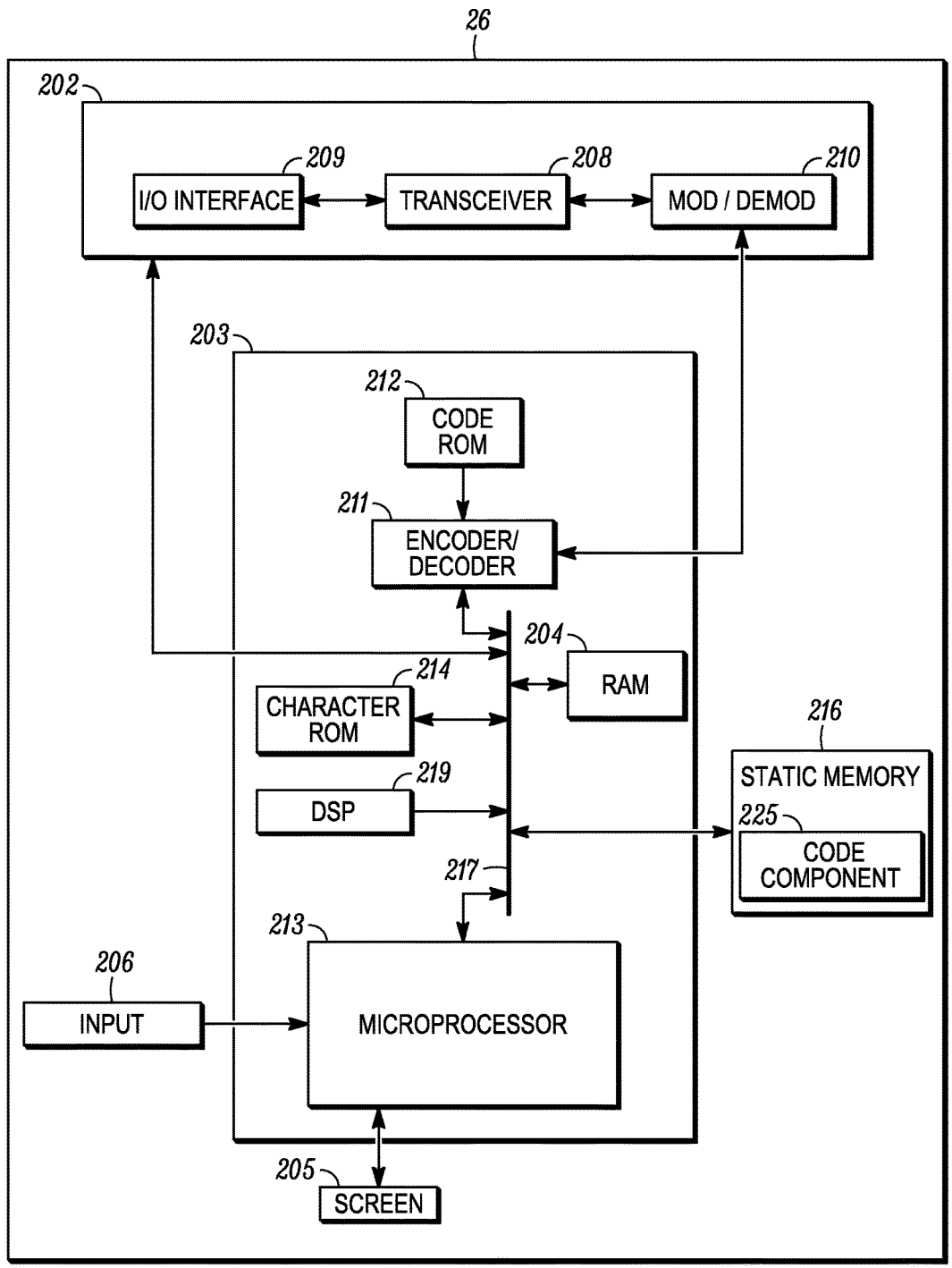
FIG. 2 is a block diagram of a conference server in accordance with some embodiments.

Referring to FIG. 2, a block diagram illustrates a conference server 26 used in accordance with some embodiments. The conference server 26 includes a communications unit 202 coupled to a common data and address bus 217 of a processing unit 203. The conference server 26 may also include an input unit (e.g., keypad, pointing device, etc.) 206 and a display screen 205, each coupled to be in communication with the processing unit 203.

The processing unit 203 may include an encoder/decoder 211 with an associated code ROM 212 for storing data for encoding and decoding voice, data, control, or other signals that may be transmitted or received by the conference server 26. The processing unit 203 may further include a microprocessor 213 coupled, by the common data and address bus 217, to the encoder/decoder 211, a character ROM 214, a RAM 204, and a static memory 216. The processing unit 203 may also have access to a secure key store, perhaps stored in one or more of RAM 204 and static memory 216, for retrieving corresponding encryption keys for link and/or end-to-end decrypting incoming encrypted auditory data streams and encrypting outgoing (summed or un-summed) auditory data streams.

The processing unit 203 may also include a digital signal processor (DSP) 219, coupled to the common data and address bus 217, for operating on incoming auditory data streams received from one or more SDs or the static memory 216. For those encrypted incoming auditory data streams, the streams may be decrypted prior to being provided to the DSP 219. For example, the DSP may be configured to, upon request, receive two separate (digital) incoming auditory data streams and mix them, in the parametric domain, and provide a summed output auditory data stream that is a summation of the two input auditory data streams. In other embodiments, the DSP may be configured, upon request, to receive two separate incoming auditory data streams, decode each auditory data stream using an appropriate (Improved Multi-Band Excitation (IMBE) or Advanced Multiband Excitation (AMBE), for example) algorithm, combine them in the time domain, and then re-encode the summed auditory data using the same or similar algorithm before providing the summed output auditory data stream that is a summation of the two input auditory data streams. The summed output (digital) auditory data stream may then optionally be encrypted prior to being transmitted out towards respective target groups of subscriber devices.

The communications unit 202 may include an I/O interface 209 configurable to communicate with network components (for example, a call controller, database, or dispatch console), and other user equipment (for example, SDs) communicatively coupled to the conference server 26. The communications unit 202 may include one or more broadband and/or narrowband transceivers 208, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Additionally or alternatively, the communications unit 202 may include one or more local area network or personal area network transceivers such as a Wi-Fi transceiver perhaps operating in accordance with an IEEE 802.11 standard (e.g., 802.11a, 802.11b, 802.11g), or a Bluetooth transceiver, for SD to SD communications. Additionally or alternatively, the communications unit 202 may include one or more wire-line transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 210 that is coupled to the encoder/decoder 211. The character ROM 214 stores code for decoding or encoding data such as control, request, or instruction messages, and/or auditory data that may be transmitted or received by the conference server. Static memory 216 may store operating code 225 associated with determining which groups should be shared with which other groups, and to responsively unidirectionally sum auditory data from an active group with auditory data from one or more of the other interested groups (if any) before forwarding the summed auditory data out to the SDs in the interested groups, including one or more of the processing steps and message transmissions and/or receptions set forth in FIG. 3. Static memory 216 may further store digital audio tones for summing with one or more group auditory data streams upon request.

2. PROCESS FOR UNIDIRECTIONAL SUMMING OF GROUP AUDITORY DATA

Figure 3:
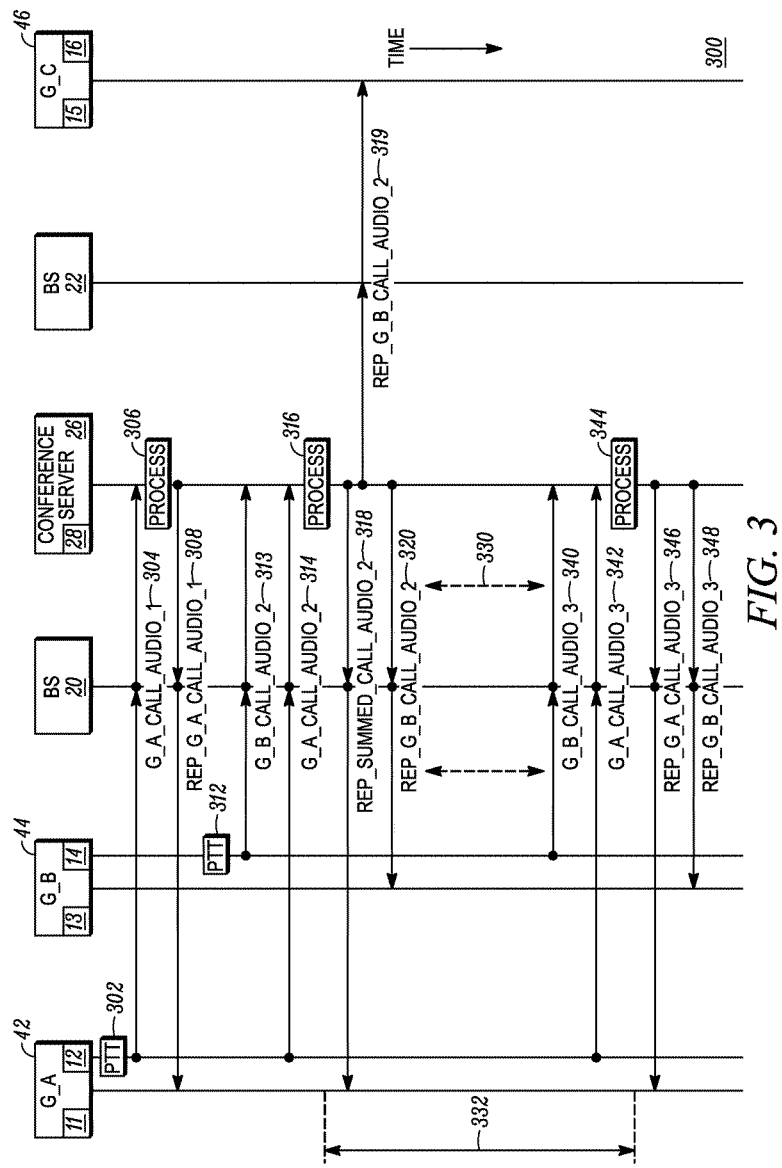
FIG. 3 is a timing diagram illustrating processing steps and message transmissions across devices in the communications network of FIG. 1 for implementing unidirectional summing of group auditory data in accordance with an embodiment.

FIG. 3 sets forth a timing diagram 300 illustrating an example in a communications network, such as communications network 10 of FIG. 1, of unidirectional summing of group auditory data consistent with the present disclosure. Of course, additional steps, receptions, and/or transmissions not disclosed herein could be additionally added before, after, or in-between steps, receptions, and/or transmissions disclosed in FIG. 3, and the presence of such additional steps, receptions, and/or transmissions would not negate the purpose and advantages of the examples set forth in detail throughout the remainder of this disclosure.

Although not illustrated in FIG. 3, it is assumed that groups G_A 42, G_B 44, and G_C 46 have already been created and affiliated with by respective SDs 11-16 prior to the first process step 302.

While a group of SDs may be created in any number of ways, in a first example of setting up a group, a user of the SD or perhaps a communications network operator may statically define affiliated member SDs with a particular group and assign the group a particular group ID (identifier), and in a second example, users of SDs interested in a particular group may dynamically affiliate (and/or disassociate) with that group and a controller may be configured to track group membership and route calls accordingly. A database, such as database 28 of FIG. 1 or similar thereto, may store affiliation information that maps the SDs with each particular group (and thus group ID) with which it is (statically or dynamically) affiliated. Group IDs used to uniquely identify the group of SDs to which a group call is directed may be included in a call request, included in a call header preceding or appended to a group call transmission, and/or embedded in group call transmissions sent from SDs themselves (for example, in a trunked DMR system). In a still further embodiment, an identity of a conventional channel on which the group call was received (for example, in a conventional P25 system) may be used to identify a group of SDs operating on that conventional channel. Identifiers used to distinguish channels in conventional systems may be associated with the frequency on which that channel operates, or may be some alpha-numeric string assigned by a conventional system operator, among other possibilities.

Furthermore, while a new group call generally requires a call setup procedure including a call request transmitted by the call initiating SD and a call grant acknowledging and granting the requested group call transmitted back to the call initiating SD via its serving BS, such details are well known to one of ordinary skill are not illustrated in FIG. 3 for ease of illustration purposes.

In any event, at step 302, a SD 12 that is a member of group G_A 42 detects the depression of a PTT button indicating a desire of its user to transmit auditory data to other SDs in its subscribed group G_A 42 (in this example, including only SD 11). Accordingly, and in response, the SD 12 captures its user's voice (assuming voice was intended to be transmitted, instead of some other audio and/or audio/video), encodes the voice into one or more voice packets, and transmits the one or more voice packets in a G_A_call_audio_1 304 (a first portion of a first group auditory data stream for group G_A) transmission to its serving BS 20, which then forwards the auditory data to the conference server 26.

At step 306, the conference server 26 receives the G_A_call_audio_1 304 transmission, decodes the transmission, and determines whether any other groups of SDs are interested in the auditory data from the transmission. In other embodiments, the determination at step 306 of whether any other groups of SDs are interested in the auditory data for G_A 42 could also be executed at a time at which a call request is transmitted and received at conference server 26 (from SD 12), and the determination saved and applied to subsequently received transmissions in the auditory data stream being transmitted by SD 12.

Determining whether any other groups are interested in the auditory data may include determining what group the auditory data originates from (in this case, group G_A 42 is the group call originating group) and accessing a mapping to determine if any other groups are interested in receiving the auditory data from the determined originating group. For example, and with respect to FIG. 1, the conference server 26 may retrieve a group identifier from the G_A_call_audio_1 304 transmission (e.g., from a previously transmitted call request, via a header, embedded in the auditory data, or via a channel identifier identifying a channel on which the call was transmitted, among other possibilities) identifying the originating group, and access a database such as database 28 to retrieve a group mapping. A first example group mapping is set forth in Table I as a first inter-group subscription mapping.

TABLE I

First Example Inter-Group Subscription Mapping

| Call Originating Group (Identifier): | Subscribed/ Interested Groups: |
| --- | --- |
| G_A | <Null> |
| G_B | G_A, G_C |
| G_C | G_A |
| G_D | <Null> |

In the first example set forth in Table I, a first column may list each possible group call originating group (by group identifier) in the system and a second column may list, for each group call originating group, which other groups are interested in/subscribed to the originating group. In the example set forth in Table I, for example, group G_B may be a higher priority group as it is subscribed to by most other groups in the system (e.g., groups G_A and G_C). More specifically, group G_B may be, for example, a commander or fire chief group, or some other group that it is likely to be communicating highly important information that should be made available to most or all other groups, independent of whether those other groups are already in an existing call or not. Furthermore, group G_B is not subscribed to or interested in any of the other groups, which means that no auditory data from the other groups will be directed back to group G_B (e.g., it is a one-way directional summing of group auditory data from group G_B to groups G_A and G_C, such that auditory data from groups G_A and G_C are not made available to group G_B SDs).

Group G_C may be a second level (intermediate priority) group that, while not subscribed to by the top level group G_B, is subscribed to by at least one other group G_A. Lastly, group G_A is the third level (lowest priority) group and does not have any other groups interested in its auditory data (e.g., its subscriber list is set to the <Null> value).

Group G_D has an assigned priority level of <Null>, and also does not subscribe to any other groups, and thus behaves in a traditional manner (e.g., no auditory data from other groups is copied to group G_D, and no auditory data from group G_D is copied to other groups). This allows certain groups to maintain their traditional operation and to work in a system also supporting unidirectional summing of group auditory data for those groups that desire the feature.

A second example group mapping is set forth in Table II as a second inter-group subscription mapping.

TABLE II

Second Example Inter-Group Subscription Mapping

| Call Originating Group (Identifier): | Subscribed/ Interested Groups: | Emergency Call Subscribed/ Interested: |
| --- | --- | --- |
| G_A | <Null> | G_B, G_C |
| G_B | G_A, G_C | <Null> |
| G_C | G_A | G_B |
| G_D | <Null> | <Null> |

The second example inter-group subscription mapping set forth in Table II adds an additional, column to the mapping set forth in Table I that separately sets out what types of emergency calls each group is interested in receiving, if any. Emergency calls may be differentiated from non-emergency calls through call signaling generated at the transmitting SD by setting an emergency call indicator in a call request, a call header, or embedded an emergency call indicator in the call payload frames including, for example, in link control messages. The conference server 26 may then use the signaled emergency call indicator to separately determine how to route the call amongst known groups. For example, in Table II above, while group G_A is not subscribed to by any other groups for non-emergency group calls, groups G_B and G_C are subscribed to receive emergency call auditory data from group G_A during a group G_A emergency call. Furthermore, while group G_A is subscribed to group G_C for non-emergency calls, it is not subscribed to group G_C for emergency calls. Group G_B, on the other hand, is not subscribed to group G_C for non-emergency calls but is subscribed to group G_C for emergency calls. Of course, other methods of handling emergency calls could be used as well. For example, in a further alternative embodiment, the conference server 26 may be configured to include all other known groups in any detected emergency call as interested groups. Other possibilities exist as well. Group G_D, in this example, continues to operate in a traditional manner, similar to the example of Table I set forth earlier.

In a still further embodiment, conference server 26 may additionally or alternatively access a different type of group mapping, such as an inter-group priority mapping, to determine if any other groups are interested in receiving an active group's auditory data. For example, and with respect to FIG. 1, the conference server 26 may retrieve a group identifier from the G_A_call_audio_1 304 transmission itself (or retrieve from a previously transmitted call request or channel identifier received at the conference server 26 prior to the G_A_call_audio_1 304 transmission) identifying the originating group, and access a database such as database 28 to retrieve an inter-group priority mapping. A first example inter-group priority mapping is set forth in Table III.

TABLE III

First Example Inter-Group Priority Mapping

| Group (Identifier): | Group Priority Level: |
|---|---|
| G_V, | 1 |
| G_W, G_X | 2 |
| <Null> | 3 |
| G_Y, G_Z | <Null> |

In the first example inter-group priority mapping set forth in Table III, a group priority or hierarchy is set forth in the $2^{nd}$ column and corresponding group call originating groups for each priority level are identified in the $1^{st}$ column. In this example, all groups having a priority level below an existing higher priority level receive a copy of auditory data of the higher priority level group's originating group call. For example, and with respect to Table III, groups G_W and G_X would receive auditory data from group G_V, summed with any active auditory data of its own respective G_W or G_X group members, because their priority level is below that of group G_V. Conversely, group G_V would not be copied on auditory data of groups having a priority level below its priority level, including in this example, groups G_W and G_X.

Whether groups at a same priority level are copied on active auditory data could be configured based on the radio communication system operator's preference. For example, in one embodiment, groups G_W and G_X would always have their auditory data mixed together. In an alternative embodiment, groups G_W and G_X would never have their auditory data mixed together. Group G_V may be, for example, a commander or battalion group or some other group that it is likely to be communicating highly important information that should be made available to lower priority groups, independent of whether those other groups are already in an existing call or not. Groups G_W and G_X may be second level (intermediate priority) groups used by, for example, those officers working under command of the commander group G_V, or as separate platoons that are part of a larger battalion that may switch to group G_V to transmit important battalion-wide information.

Furthermore, groups G_Y and G_Z are assigned a priority level of <Null>, and are accordingly configured to behave in a traditional manner (e.g., no auditory data from other groups are copied to (or summed with) groups G_Y or G_Z, and no auditory data from groups G_Y or G_Z are copied to (or summed with) other groups). This allows certain groups to maintain their traditional operation and to work in a system also supporting unidirectional summing of group auditory data for those groups that desire the feature.

Similar to Tables I and II, Table III may be modified to incorporate separate relative priority rankings for emergency calls for each group, which may or may not differ from the rankings used for non-emergency calls set forth in Table III.

Returning to and using the example set forth in Table I above (although, in other embodiments, the examples set forth in Tables II or III could additionally or alternatively be used), at step 306, the conference server 26 accesses the stored group mapping (in this example, the first inter-group subscription mapping of Table I), determines that no other groups are interested in the group auditory data received in the G_A_call_audio_1 304 transmission, and then forwards the G_A_call_audio_1 304 auditory data in the repeated rep_G_A_call_audio_1 308 transmission, by itself or via some other call controller in coupled network 24, back to the remaining group G_A SDs currently being served via BS 20.

At step 312, a SD 14 that is a member of group G_B 44 detects the depression of a PTT button indicating a desire of its user to transmit auditory data to its subscribed group members in group G_B 44 (in this case, including only SD 13). Accordingly, and in response, the SD 14 captures its user's voice, encodes the voice into one or more voice packets, and transmits the one or more voice packets in a G_B_call_audio_2 313 transmission (a first portion of a second group auditory data stream for group G_B) to its serving BS 20, which then forwards the auditory data to the conference server 26. At substantially a same or overlapping time, SD 12 again captures its user's voice, encodes the voice into one or more voice packets, and transmits the one or more voice packets in a G_A_call_audio_2 314 transmission (a second portion of the first group auditory data stream for group G_A) to its serving BS 20, which then again forwards the auditory data to the conference server 26.

While the example set forth in FIG. 3 focuses on unidirectional summing of group auditory data sourced from a transmitting SD from each of groups G_B 44 and G_A 42, in other embodiments, a source of group auditory data may instead be a dispatch console such as the dispatch console 38 of FIG. 1, which allows a dispatcher to generate and transmit dispatch instructions or other types of audio to one or more groups of SDs. Accordingly, the SD 14 of FIG. 3 could, in some embodiments, be replaced with the dispatch console 38 of FIG. 1, and same or similar processes as disclosed herein would be applied to the auditory data sourced from the dispatch console 38 and similarly targeted at the group G_B 44. Other variations are possible as well.

At step 316, the conference server 26 receives both the G_A_call_audio_2 314 transmission and the G_B_call_audio_2 313 transmission, decodes the transmissions, and determines whether any other groups are interested in group auditory data received in either one of the transmissions. For example, the conference server 26 may retrieve a group identifier from the G_A_call_audio_2 314 transmission identifying the group call originating group, and access a database to retrieve a group mapping.

Again referring to the example first inter-group subscription mapping set forth in Table I above, at step 316, the conference server 26 accesses the stored inter-group subscription mapping and determines that no other groups are interested in the group auditory data received in the G_A_call_audio_2 314 transmission. The conference server 26 additionally accesses the stored inter-group subscription mapping and determines that two other groups (groups G_A 42 and G_C 46) are interested in the group G_B 44 originating auditory data received in the G_B_call_audio_2 313 transmission. Accordingly, the conference server 26 determines whether there is any existing auditory data for either of groups G_A 42 or G_C 46 with which to sum the group G_B 44 auditory data before sending the group G_B 44 auditory data back out to group G_B 44 and to the subscribed/interested groups (G_A 42 and G_C 46 in this case). In this example, the conference server 26 determines that there is existing auditory data for group G_A 42 received at the conference server 26, but that there is no existing auditory data for group G_C 46 at this time.

In response to determining that there is existing auditory data for a group (group G_A 42) that is also subscribed to/interested in the auditory data of group G_B 44, the conference server 26 sums the received auditory data from the G_A_call_audio_2 314 transmission and the G_B_call_audio_2 313 transmission, perhaps via a DSP circuit such as the DSP circuit 219 illustrated in FIG. 2, to form summed auditory data that is a combination of the auditory data from the G_A_call_audio_2 314 transmission and from the G_B_call_audio_2 313 transmission. As set forth with respect to FIG. 2, the summing of the auditory data may be executed by the conference server 26 in the parametric domain or in the time domain.

The conference server 26 then transmits the summed auditory data back to the group G_A 42 SDs in the rep_summed_call_audio_2 318 transmission to group G_A 42 SDs via BS 20.

Because there is no existing call and no existing corresponding auditory data from group G_C 46, the conference server 26 sends a PTT group call request to another network device such as a zone controller to set up a new call to group G_C and, once the call is granted by the another network device, the conference server 26 can merely transmit a copy of the auditory data from the G_B_call_audio_2 314 transmission to the group G_C 46 SDs in a rep_G_B_call_audio_2 319 transmission via the serving BS 22. Finally, and because group G_B 44 is not subscribed (e.g., not interested in receiving a copy of) auditory data from any other groups, the conference server 26 simply sends the auditory data from the G_B_call_audio_2 314 transmission back to the group G_B 44 SDs in a rep_G_B_call_audio_2 320 transmission via the serving BS 20.

As indicated via dashed lines 330, the G_A 42 and G_B 44 group calls may continue in a manner similar to that set forth in message transmissions, receptions, and processing steps 313-320 indefinitely, until one or more of the group calls is terminated by an initiating/transmitting SD (e.g., SDs 12 and 14, in the above example). Alternatively, and in one embodiment, the summing of auditory data between interested/subscribed groups may be halted after a threshold period of time during which the interested or subscribing SDs can determine whether the summed in/subscribed to group call is of interest (or of more interest than a possibly simultaneously occurring group call in their own group) such that they may choose to join the group call on the call originating group in a traditional manner, such as by utilizing a user interface on their SD to change a channel switch, frequency selector, or other knob or input from its current setting to a setting to match a talkgroup, frequency, channel, or other group identifier of the call originating group.

In the example set forth above, SDs in groups G_A 42 and G_C 46 may be copied in on the auditory data transmitted from group G_B 44 for only a threshold period of time (indicated via line 332 in FIG. 3), after which time the summing of auditory data originating from group G_B 44 to groups G_A 42 and G_C 46 is terminated. During the threshold period of time 332, users of SDs in groups G_A 42 and G_C 46 can determine whether they want to switch their SD to a channel corresponding to the originating group G_B 44 to continue receiving auditory data from the originating group G_B 44. Absent further action by the SD users in groups G_A 42 and G_C 46, the summing of auditory data from group G_B 44 to the SD users in groups G_A 42 and G_C 46 will cease after the threshold period of time 332 expires. The threshold period of time may be, for example, between 5 and 300 seconds, or between 5 and 60 seconds, or some other range of time.

For example, and as illustrated in FIG. 3, subsequent auditory data transmissions G_B_call_audio_3 340 and G_A_call_audio_3 342 from SDs 14 and 12, respectively, are received and processed at conference server 26 at step 344. Even though groups G_A 42 and G_C 46 are mapped as being subscribed to or interested in the auditory data from group G_B 44, because the threshold period of time 332 has expired (as determined by the conference server at step 344), subsequent portions of the auditory data stream from group G_B 44 are not provided to either of groups G_A 42 or G_C 46 for the remainder of the group G_B 44 call.

Instead, and as illustrated in FIG. 3, the conference server 26, due to the expiration of the threshold period of time 322332, determines that no other groups are interested in the group auditory data received in the G_B_call_audio_3 340 transmission (and as previously noted, determines that no other groups are interested in the group auditory data received in the G_A_call_audio_3 342 due solely to the inter-group subscription mapping and not the passage of time), and then (i) forwards the auditory data from the G_A_call_audio_3 342 transmission in the repeated rep_G_A_call_audio_3 346 transmission back to the group G_A 42 SDs via BS 20 and (ii) forwards the auditory data from the G_B_call_audio_3 340 transmission in the repeated rep_G_B_call_audio_3 348 transmission back to the group G_B 44 SDs via BS 20. As illustrated, and assuming that there is still no active transmitting SD in group G_C 46, no auditory data is provided to group G_C 46 SDs by the conference server 26 in this scenario. In some embodiments, an explicit call teardown message (not shown) may be transmitted to G_C 46 SDs after passage of the threshold period of time 332 to explicitly end G_C's 46 temporary receive-only participation in the G_B 44 call. In other embodiments where the call of interest (G_B 44 in this case) ends prior to expiration of the threshold period of time 332, the explicit call teardown message may be transmitted after the call of interest is ended and before expiration of the threshold period of time 332. Other possibilities exist as well.

3. CONCLUSION

In accordance with the foregoing, an improved method and apparatus for selectively allowing auditory data in one group to be received and heard in one or more other groups, without requiring any ongoing calls in the other groups to be terminated, and without requiring all auditory data to be shared amongst all groups, is disclosed. As a result, a more intuitive, useful, and efficient group communications system can be provided, improving communication capabilities of incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for unidirectional summing of group auditory data, the method comprising:
receiving, at a conference server, a first portion of a first group auditory data stream, from one of a transmitting subscriber device of a first group of a plurality of subscriber devices and a dispatch console, for receipt by the first group of subscriber devices;
determining, by the conference server, whether group auditory data generated for the first group of subscriber devices is of interest to a second group of a plurality of subscriber devices, the second group of subscriber devices having no overlap with the first group of subscriber devices, for receipt by the second group of subscriber devices;

receiving, at the conference server, a first portion of a second group auditory data stream from a transmitting subscriber device of the second group of subscriber devices; and responsive to determining, by the conference server, that group auditory data generated for the first group of subscriber devices is of interest to the second group of subscriber devices:
  forwarding, by the conference server, the first portion of the first group auditory data stream towards the first group of subscriber devices;
  summing, by the conference server, the first portion of the second group auditory data stream with the first portion of the first group auditory data stream to form a summed group auditory data stream; and
  forwarding, by the conference server, the summed group auditory data stream towards the second group of subscriber devices.

2. The method of claim 1, further comprising, responsive to subsequently determining, by the conference server, that group auditory data generated for the first group of subscriber devices is not of interest to the second group of subscriber devices:
  forwarding, by the conference server, a second portion of the second group auditory data stream towards the second group of subscriber devices; and
  forwarding, by the conference server, a second portion of the first group auditory data stream towards the first group of subscriber devices.

3. The method of claim 1, further comprising,
  receiving, at the conference server before the first portion of the first group auditory data stream, a second portion of the first group auditory data stream from the transmitting subscriber device of the first group of subscriber devices, and forwarding the second portion of the first group auditory data stream towards the first group of subscriber devices.

4. The method of claim 1, wherein the first group of subscriber devices are members of a first talkgroup having a first talkgroup identifier, and wherein the second group of subscriber devices are members of a second talkgroup having a second talkgroup identifier different from the first talkgroup identifier.

5. The method of claim 4, wherein the first talkgroup operates on a first assigned traffic channel at a first trunked base station and the second talkgroup operates on a second assigned traffic channel at a second trunked base station.

6. The method of claim 1, further comprising determining that the first group auditory data is of interest to the second group of subscriber devices by determining, at the conference server, one of (i) that the first group auditory data stream includes emergency group auditory data and (ii) that the first group is a higher priority group than the second group.

7. The method of claim 6, further comprising determining that the first group auditory data stream includes emergency group auditory data by decoding one of a call request preceding the first group auditory data stream and a header appended to or embedded in the first group auditory data stream.

8. The method of claim 1, wherein determining whether the group auditory data generated for the first group of subscriber devices is of interest to the second group of subscriber devices comprises determining, by the conference server, that the first group of subscriber devices is a higher priority group of subscriber devices than the second group of subscriber devices by accessing an inter-group priority mapping from a data store of priority information and determining, from the inter-group priority mapping, that the first group of subscriber devices is a higher priority group of subscriber devices than the second group of subscriber devices.

9. The method of claim 1, wherein determining whether the group auditory data generated for the first group of subscriber devices is of interest to the second group of subscriber devices comprises determining, by the conference server, that the second group of subscriber devices is subscribed to receive auditory data from the first group of subscriber devices by accessing an inter-group subscription mapping from a data store of subscription information and determining, from the inter-group subscription mapping, that the second group of subscriber devices is subscribed to receive auditory data from the first group of subscriber devices.

10. The method of claim 1, wherein the first group of subscriber devices operates on a first frequency at a first conventional base station, and the second group of subscriber devices operate on a second frequency at a second conventional base station different from the first conventional base station.

11. The method of claim 1, further comprising refraining from summing the first portion of the second group auditory data stream into the first group auditory data stream prior to forwarding, by the conference server, the first group auditory data stream to the first group of subscriber devices.

12. The method of claim 1, further comprising:
  receiving, at the conference server, a first portion of a third group auditory data stream from a first transmitting subscriber device of a third group of subscriber devices;
  determining, by the conference server, whether the first portion of the third group auditory data stream is of interest to one or both of the first and second groups of subscriber devices; and
  selectively summing the first portion of the third group auditory data stream with auditory data received for one or both of the first and second groups of subscriber devices in accordance with the determination of whether the first portion of the third group auditory data stream is of interest to one or both of the first and second groups of subscriber devices.

13. The method of claim 12, further comprising forwarding, by the conference server, the first portion of the third group auditory data stream towards the third group of subscriber devices.

14. The method of claim 1, further comprising, responsive to determining that group auditory data generated for the first group of subscriber devices is of interest to the second group of subscriber devices:
  continuing to sum, by the conference server, group auditory data generated for the first group of subscriber devices with group auditory data generated for the second group of subscriber devices for a predetermined threshold period of time, and forwarding the summed group auditory data to the second group of subscriber devices during the threshold period of time; and
  after the predetermined threshold period of time, refraining from summing group auditory data generated for the first group of subscriber devices with group auditory data generated for the second group of subscriber devices, and instead, forwarding group auditory data generated for the second group of subscriber devices to the second group of subscriber devices without summing group auditory data generated for the first group of subscriber devices.

15. The method of claim 14, wherein the threshold period of time is between 5 and 300 seconds.

16. The method of claim 1, wherein summing, by the conference server, the first portion of the first group auditory data stream with the first portion of the second group auditory data stream to form summed group auditory data comprises summing the first portion of the first group auditory data stream with the first portion of the second group auditory data stream in the parametric domain.

17. A conference server for unidirectional summing of group auditory data, the server comprising:
    a transceiver;
    a data store; and
    one or more processors configured to:
        receive, via the transceiver, a first portion of a first group auditory data stream, from one of a transmitting subscriber device of a first group of a plurality of subscriber devices and a dispatch console, for receipt by the first group of subscriber devices;
        determine whether group auditory data generated for the first group of subscriber devices is of interest to a second group of a plurality of subscriber devices, the second group of subscriber devices having no overlap with the first group of subscriber devices, for receipt by the second group of subscriber devices;
        receive, via the transceiver, a first portion of a second group auditory data stream from a transmitting subscriber device of the second group of subscriber devices; and
        responsive to determining, via the data store, that group auditory data generated for the first group of subscriber devices is of interest to the second group of subscriber devices:
            forward, via the transceiver, the first portion of the first group auditory data stream towards the first group of subscriber devices;
            sum the first portion of the second group auditory data stream with the first portion of the first group auditory data stream to form a summed group auditory data stream; and
            forward, via the transceiver, the summed group auditory data stream towards the second group of subscriber devices.

18. The conference server of claim 17, wherein the one or more processors are further configured to:
    responsive to subsequently determining, via the data store, that group auditory data generated for the first group of subscriber devices is not of interest to the second group of subscriber devices:
        forward, via the transceiver, a second portion of the second group auditory data stream towards the second group of subscriber devices; and
        forward, via the transceiver, a second portion of the first group auditory data stream towards the first group of subscriber devices.

19. The conference server of claim 17, wherein the one or more processors are further configured to:
    receive, via the transceiver and before the first portion of the first group auditory data stream, a second portion of the first group auditory data stream from the transmitting subscriber device of the first group of subscriber devices, and forward, via the transceiver, the second portion of the first group auditory data stream towards the first group of subscriber devices.

20. The conference server of claim 17, wherein the one or more processors are further configured to: refrain from summing the first portion of the second group auditory data stream into the first group auditory data stream prior to forwarding, by the conference server, the first group auditory data stream to the first group of subscriber devices.

\* \* \* \* \*